Figure 1:
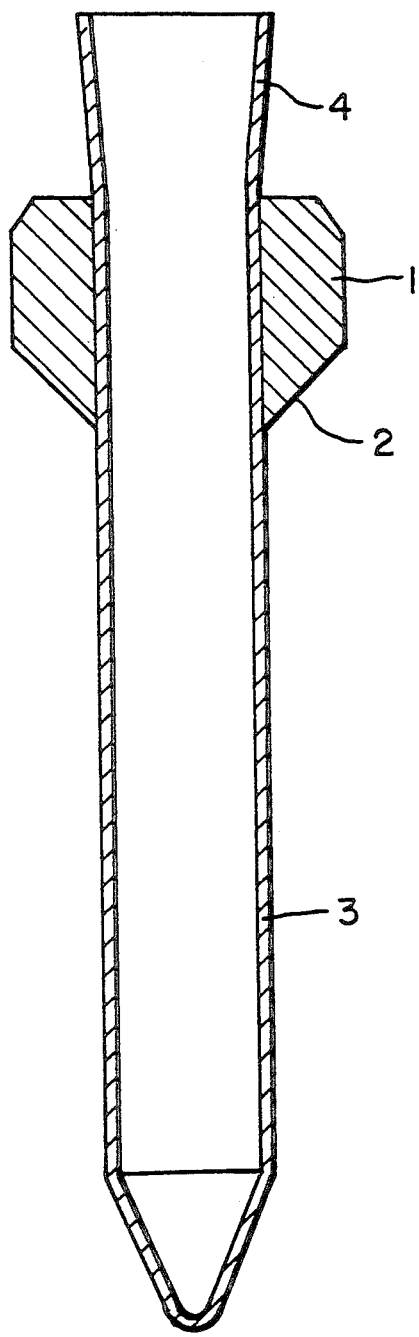

United States Patent [19]

Larsen

[11] Patent Number: 5,114,380
[45] Date of Patent: May 19, 1992

[54] METHOD FOR EVISCERATING ANIMAL CARCASSES, PREFERABLY PIG CARCASSES, A PLUG AND PLANT THEREFOR

[75] Inventor: Poul Larsen, Alleroed, Denmark

[73] Assignee: Slagteriernes Forskningsinstitut, Denmark

[21] Appl. No.: 584,255

[22] Filed: Sep. 18, 1990

[30] Foreign Application Priority Data

Sep. 29, 1989 [NL] Netherlands .......................... 4846/89

[51] Int. Cl.⁵ ............................................ A22C 21/00
[52] U.S. Cl. .................................... 452/176; 452/109; 452/120; 128/401; 128/DIG. 25; 606/197
[58] Field of Search ............... 452/176, 109, 120, 106, 452/122; 138/89; 156/80; 128/401, DIG. 25; 606/197

[56] References Cited

U.S. PATENT DOCUMENTS

| 4,563,182 | 1/1986 | Stoy et al. | 128/401 |
| 4,938,221 | 7/1990 | Tuffel | 606/197 |
| 4,981,465 | 1/1991 | Ballan et al. | 128/DIG. 25 |

Primary Examiner—Willis Little

[57] ABSTRACT

A method for eviscerating pig carcasses comprising insertion of a plug into the anus of the carcass in order to avoid contamination of the carcass.

Before the plug is inserted into the anus it is cooled down to a low temperature, such as below −20° C. The plug will freeze on to the area around the anus sealing the anus tightly.

In this way the casing contents will not flow out during the cutting or boring-out of the rectum and further treatment of the casings.

The plug comprises a sealing section 1 having a large cold capacity.

7 Claims, 4 Drawing Sheets

METHOD FOR EVISCERATING ANIMAL CARCASSES, PREFERABLY PIG CARCASSES, A PLUG AND PLANT THEREFOR

The present invention relates to a method for eviscerating animal carcasses, preferably pig carcasses, by which a plug is inserted into the anus of the carcass and a cut is provided around the anus.

In connection with the evisceration of a pig carcass an operator opens the carcass by making a vertical cut in the belly. Then the operator cuts free and pulls out different parts of the viscera. He cuts free the rectum by cutting in the meat around the anus by means of a knife.

In connection with the cutting-free and pulling-out operations there is a risk that the carcass and casings will be contaminated by casing contents flowing from the anus.

Danish Patent No. 123.065 describes a plug designed for insertion into the anus before the rectum is cut free. The plug will be removed again after the casings have been removed from the carcass. However, the plug does not guard against contamination of the carcass and casings, since it is easy for the operator accidentally to cut into the casing during the cutting-free operation. It may also happen that the plug does not fit tightly or even that it comes off, resulting in a contamination anyhow.

In Danish Patent No. 129.495 is a description of a device designed to cut free the animal part around the anus, especially on poultry. A modified design of the device is being used in bacon factories for cutting-free rectums of pig carcasses. The use of the device facilitates the work of the operator considerably, and to a great extent damaging of the casing itself is avoided, which would have caused the casing contents to flow out and contaminate the carcass. However, this device does not guard against cutting into ham parts and casing.

The device includes a rotary, cylindrical knife operated by a pneumatic engine. Located in the axis of the cylinder is a guide pin which protrudes in front of the edge of the knife. The guide pin is designed to be inserted into the anus, and it will control the rotation and cutting of the knife around the anus.

However, after the rectum has been cut free there may be a risk that casing contents will flow out through the anus during the subsequent loosening and treatment of the casings, as there is no plug to stop a possible flow and as the casing has been exposed to vacuum during the boring-out operation.

The object of the present invention is to provide an eviscerating method by which a good sealing is obtained by means of a plug which is inserted into the anus of a carcass, and whereby a cutting operation centred around the anus is provided, which reduces the risk of damaging ham parts. Preferentially, it shall also be possible to cut free the rectum with a cutting device of the type mentioned above with a rotary, cylindrical knife.

The method of the invention is characterized in that the plug is cooled down to a temperature which is below the freezing point of water before it is inserted into the anus.

The method according to the invention provides a reliable sealing of the anus, since tissues and meat parts opposite the seal faces of the plug are chilled, so that these sections become less flexible and more rigid, which will ensure the sealing during the cutting-out operation and the subsequent loosening and further treatment of the casings. Due to the improved control of the knife, as a consequence of the stiffening of the rectum around the plug, the risk of cutting wrongly or unprecisely around the anus is reduced.

The plug used may be small enough to fit easily into the cavity of the rotary, cylindrical knife as this knife gradually cuts into the parts around the anus.

An embodiment of the method of the invention may provide an extra reliable sealing and a strong securing between the seal faces of the plug and the surface of the carcass at the anus. This embodiment comprises cooling the plug down to such a temperature that, after the insertion into the anus, it will freeze on to the carcass at the anus.

When unfrozen, the area around the anus is flexible, and it adapts to the shape of the seal faces of the plug. After freezing of tissues and meat parts in contact with the seal faces, said sections become quite rigid, and they will retain close contact with the seal faces of the plug.

Furthermore, the expansion provided by the freezing of the sections around the anus will produce a sealing pressure against the plug, which will continue until the whole section is thawn. This will result in a reliable sealing. A plug which is fixed by freezing in this way will also ensure that the casing contents are not exposed to any vacuum during the boring-out operation.

Small amounts of water on the surface of the carcass will not have an adverse influence on the sealing. They may even contribute to establishing an even more reliable sealing, since the water will fill out any pores and cavities, and then it will stiffen into a hard mass of ice when cooled down to a temperature below the freezing point of water.

The parts around the anus are preferably frozen to such a degree that a reliable freeze-sealing is retained during the cutting-free operation and the following loosening and treatment of the rectum and the casings. The degree of freezing and cooling of the parts around the anus is determined by the temperature of the sealing section of the plug, its heat conductivity and cold capacity, and the contact of the seal faces with the surface of the carcass which is to be frozen.

In order to establish the mentioned degree of cooling and freezing, before insertion the plug is preferentially cooled down to a temperature of $-20°$ C. or below, especially $-40°$ C. or below.

The plug may be cooled down to the desired temperature by means of liquid nitrogen or dry ice (carbon dioxide). By means of these harmless refrigerating agents the plug may quickly obtain the desired low temperature, e.g. by dipping the plug into a container with one of these refrigerating agents.

It is also possible to cool the plug down to the desired temperature using more traditional cooling methods, such as a refrigerating machine with a recirculating coolant. The plug may e.g. pass through a chilling tunnel provided with heat-exchanger elements of a refrigerating machine.

As already mentioned, it may be an advantage if there is humidity on the surface of the carcass at the anus. The humidity may even be added deliberately by means of a spray device.

According to an embodiment of the invention the plug is moistened before or after it is inserted into the anus. In this way a more reliable sealing may be provided.

Preferably, the plug has a high heat capacity and heat conductivity in the sealing section having seal faces fitting tightly against tissues and meat parts. In this embodiment large amounts of cold are conducted quickly from the plug to tissues and meat parts around the anus, freezing the anus and keeping it frozen for the period necessary, e.g. 2-20 minutes, before the heat from the carcass again gets the advantage and thaws the areas, resulting in a reduced sealing and securing to the plug.

The sealing section of the plug may e.g. be made of metal, such as nickel bronze. It is preferentially designed in such a way that it gets good heat exchange with the parts around the anus, but moreover so that it exchanges heat only to a minimum with other component parts of the plug or with other parts of the carcass outside the seal faces.

According to a special embodiment, the plug is made of a liquid such as water, which has been frozen into the desired shape. Preferably, the plug comprises a stabilizing material, such as straw, saw dust or plastic material. In this embodiment the plug shall not be removed, cleaned or returned, as it will melt and run away. If desired, the stabilizing material may be regained. The plug contains moisture, which may enhance the sealing effect when the plug freezes on to the rectum.

The production of such plugs may e.g. take place in a plant for production of ice lollies, the mould will be fitted to the desired shape of the plugs. The liquid may be poured in liquid-resistant pouches and then be frozen into the desired shape. The cover of liquid-resistant material, e.g. a plastic film or metal foil, or a wrapping of similar material around the individual ice plugs will facilitate the separation of the plugs when they are to be inserted into the rectum.

Instead of liquid, also other disposable materials may be used which are formed into the desired plug shape, and which material will melt or dissolve later in the process, so that removal and recovery of the plug is unnecessary. Preferably, the material has such a low price that it doesn't matter if the plug is lost, e.g. during the further treatment of the casing in the casing plant.

In order to provide a reliable sealing by all dimensions of an anus, the sealing shall preferably take place around the anus by applying the plug to the surface of the rind. The plug may have a maximum diameter of the seal faces which is considerably larger than the average diameter of an anus, preferentially a maximum diameter of 25-70 mm.

For sows and boars the plugs primarily have a proportionally larger diameter.

A very large contact face between the rind surface and the plug is provided with seal faces being shaped as a conical surface.

It will usually take some time from the insertion of the plug until the surrounding tissue has assumed such a temperature that sealing has been obtained. Especially by the embodiment where the plug and the tissue shall freeze firmly together, it may be important that there is no interaction between the carcass and the plug until a reliable sealing has been established. Preferably, the plug is kept pressed against the surface of the carcass around the anus until the plug is firmly frozen on to the carcass.

When mentioned in the present description and claims that the plug is inserted into the anus, this should be understood as the situation where the plug provides sealing against the casing itself, or the situation where the plug has a sealing effect against the rind (crown) immediately around the anus.

The invention also relates to a plug to be used for eviscerating animal carcasses to be inserted into the anus of a carcass for sealing of the anus, said plug comprising a sealing section having seal faces. The plug according to the invention is characterized in that it is designed to absorb heat on the seal faces.

By means of this plug a better sealing is achieved than by the use of traditional plugs, which have not been designed to conduct cold from a cooled plug to the surrounding tissue.

The present plug may also be used to secure the rectum during the subsequent processing of the casings, and it will facilitate the handling, e.g. when the crown is cut off.

A particularly good sealing effect is achieved by an embodiment wherein the plug has been designed to being frozen firmly on to the carcass at the anus after refrigeration.

The contact face of the sealing section of the plug has preferentially a maximum diameter which is larger than the average diameter of an anus, preferentially 25-70 mm.

Preferably, the plug comprises seal faces which are shaped as a conical surface, said faces being designed to contact the carcass' surface around the anus.

The plug will be particularly easy to place correctly in the sealing position when it is provided, in front of the seal faces, with a guiding section which serves to centre the faces in relation to the anus. Thus, the plug may be provided with a guiding section in the shape of a closed pipe which is fastened to or in the sealing section of the plug.

A pipe will protect the inner wall of the casing against action from the rotary pin in the cutting device and it may serve as a stabilizing material in plugs made of frozen liquid, such as water.

The sealing section may have a cavity which corresponds to the cavity of the pipe. In this way it will be possible to make a cut with the cylindrical knife of the cutting device which is precisely centred around the plug. When the plug has been inserted and the sealing effect has been achieved, the pin of the device is inserted into the hole consisting of this cavity and the cavity of the pipe. While the device is being guided by the walls of the hole, the rectum is cut free in the usual way.

The device may also be guided by a protruding part on the plug. The cutting device may be provided with a fitting counterpart.

If desired, the plug may first of all be attached to the cutting device, and then in the same working operation it may be inserted and the cutting-out operation of the rectum may start.

In order to catch the pin or a counterpart of the device, the plug may be provided with a funnel-shaped part. The sealing section of the plug may for instance be provided with funnel-shaped means.

If desired, the funnel-shaped part may serve as a handle during the mechanical or manual handling and treatment of the plug, but the plug may also be provided with other means to serve as a handle. It is preferentially designed in such a way that the operator's fingers will not freeze on to the handle when holding it. Preferably, the plug shows a poor heat transmission from the handling means to the sealing section of the plug.

The invention also relates to a plant to be used for eviscerating animal carcasses comprising a station for insertion of a plug into the anus of a carcass which is entered into the station. The plant is characterized in that it includes an arrangement for the refrigeration of the plugs which are to be inserted into the carcasses.

The cooling down of plugs may take place by means of various coolants and refrigerating methods, as stated above. The insertion of a plug into a carcass may take place immediately before the rectum is to be bored out. The working operation may also take place before the carcass is conveyed through the singeing oven, in which the surface of the carcass is sterilized, among other things. Due to the high temperature in the singeing oven, it may be necessary to protect the outside part of the plug by means of a material with a poor heat conductivity, e.g. a teflon part or a polyetylene cover with a cap of stainless steel. If the plug has a central cavity, a cover or a film membrane may prevent the ingress of water from the surface treatment plant.

The insertion of a plug into a carcass may take place manually or mechanically.

The subsequent or simultaneous cutting out operation of the rectum may take place manually or mechanically, e.g. by means of the well-known device mentioned. The device may be placed in a rest and be operated in a way known per se, by some hydraulic or pneumatic cylinder units, so that the cutting-out operation of the rectum with the plug may be performed fully automatically.

When casings have been removed from a carcass, they are put into a so-called casing tray and they are conveyed, if necessary, to a plug-removal station, which may be placed before the veterinary inspection or immediately before the entrance to the casing plant. It may be necessary to dip the rectum with plug into water to speed up the thawing and loosening of the plug. This may e.g. take place by means of a water-filled gutter, located under the casing trays, into which the rectum with the plug is placed, hanging down from the rest of the casings, which are placed in casing trays in the usual way. As the plugs come loose they will fall down to the bottom of the gutter, where a conveyor belt may carry them on to the cleaning operation and renewed freezing.

The plug may be washed and sterilized, and a special transport arrangement may convey the plugs back to the station for insertion, where they are used again. The plugs may also be removed from the casings at an another stage, e.g. when the casings are being treated immediately after the veterinary inspection.

The above system for removal and returning of the plugs is superfluous for plugs made of liquid which has been frozen into the desired shape.

By using the present plug the carcasses are no longer being contaminated by casing contents when the rectum is loosened and the casings are removed. At the same time, contamination of the casings while they are in the casing tray will be avoided. This may facilitate the veterinary inspection and reduce the unpleasant smell.

The invention is described in greater detail in the following, with reference to the drawings, in which FIG. 1 shows a sectional view of a first embodiment of a plug according to the invention, FIG. 2 a first flow diagram of a method used in connection with this embodiment, FIG. 3 a second embodiment of a plug according to the invention, FIG. 4 a third embodiment of a plug according to the invention, and FIG. 5 a second flow diagram of a method used in connection with the latter embodiment.

The plug of FIG. 1 comprises a sealing section 1 with a conical seal face 2 designed to freeze on to the surface of a carcass immediately around the anus. The sealing section is provided with a bore, into which a pipe 3 has been welded, which pipe is closed and tapering in one end. At the opposite, open end the pipe has been enlarged into funnel-shaped means 4, which have been designed to catch the pin of a cutting device provided with a rotary, cylindrical knife.

Figure 2:
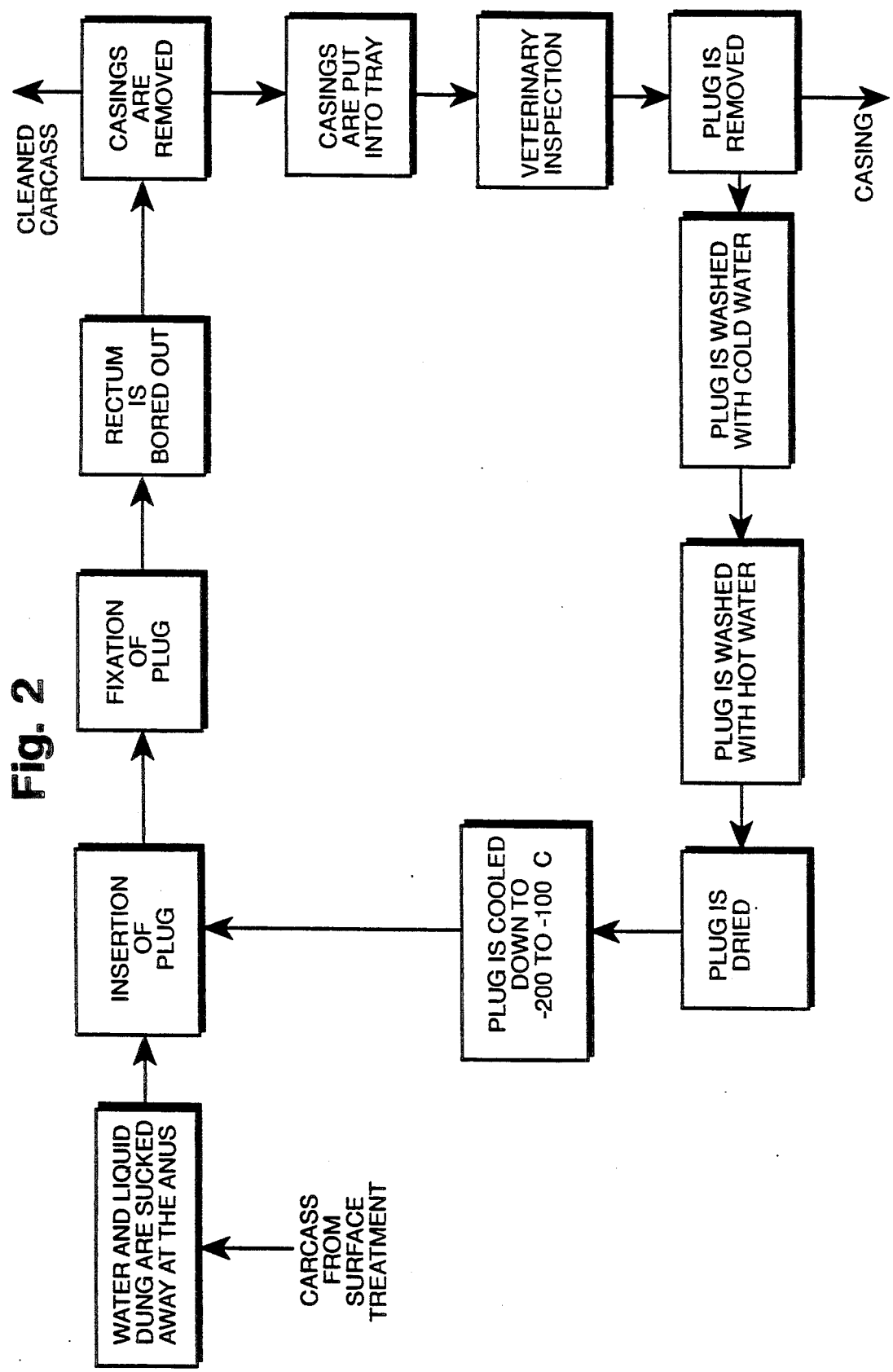

The use of the plugs of the construction shown in FIG. 1 is illustrated in FIG. 2. An uncut carcass is conveyed on the slaughter line to a station where water and any liquid dung from the anus of the carcass are sucked away. The operator inserts a vacuum-connected hose into the anus, which sucks away water and dung.

The operator then takes a plug which has been cooled down to a temperature of preferentially between $-100°$ C. and $-200°$ C. The operator inserts the plug into the anus of the carcass, the pointed end of the pipe first, unit the entire circumference of face 2 fits tightly against the surface of the rind around the anus. The operator will hold the plug pressed against the surface of the rind until the seal face has frozen firmly on to the surface of the rind. The contents of the casing are now hermetically sealed by the plug.

By means of a usual cutting device, an operator will bore out the rectum of the carcass. The pin of the device is placed in the funnel-shaped means of the plug, and the device is moved towards the carcass, by which operation the cylindrical knife cuts through the tissue around the rectum without touching the inserted plug. The boring-out operation is guided by the hole in the plug.

The cutting device is removed after the boring-out operation. The casings, plug included, are removed from the carcass and placed in a casing tray.

The casings are carried by the tray conveyor to the veterinary inspection and then on to an operator who removes the pancreas etc. and the plug. Further processing of the casing takes place in the usual way.

The plug which is removed from the casing may be placed in a net basket which may be suspended in a conveyor. The basket will be conveyed to a washing station where the plug will be sluiced with cold water. Then the basket will transport the plug to a washing section where the plug is sluiced with 82° C. hot water. The conveyor carries the plug through a drying and air-cooling station.

Next, the plug is carried through a freezing plant, in which the plug is cooled down to a temperature which is sufficiently low for the seal face to freeze firmly on to the rind surface of the carcass around the anus. The plug may e.g. be carried through a bath of liquid nitrogen with a temperature of $-196°$ C.

The plug will automatically be tipped out of the basket, which is returned to the work station where the plugs are removed from the casings. The plug is again ready to be used for sealing of the anus of a carcass.

If desired, the operational stages mentioned above may be automated. The insertion of the plug and/or the boring-out of the rectum may be performed by automatic tools, known per se.

Tests have proved that the plug seals the anus very effectively. The hygiene of the carcass is improved and the plant for surface treatment of carcasses shows less contamination. The cuts performed by the cutting device into the carcasses are also correctly placed in all cases.

Figure 3:
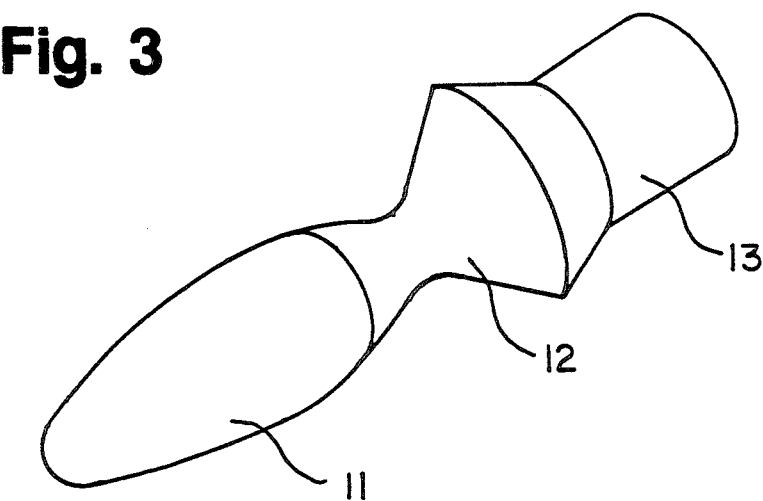

The plug in FIG. 3 consists of a polyethylene pin 11 which is designed to be inserted into the anus. Because of the poor heat conductivity of the material, the pin is less liable to stick to the casing during the insertion into the anus.

The plug is provided with a sealing section 12 made of stainless steel. The conically shaped seal face has been designed to fit tightly against the surface of the carcass immediately around the anus in order to provide freeze sealing.

The plug is provided with guiding means in the shape of a cylindrical part 13 made of teflon or the like. This part also serves as protection for the sealing section 12 against the heat from e.g. the singeing oven.

The cutting device used in connection with this plug, is not provided with any guide pin, but with a pipe section, which may be place on a cylindrical part 13 of the plug and guided by this during the boring-out of the rectum. The plug may be used in the same way as described above in connection with FIG. 1.

Figure 4:
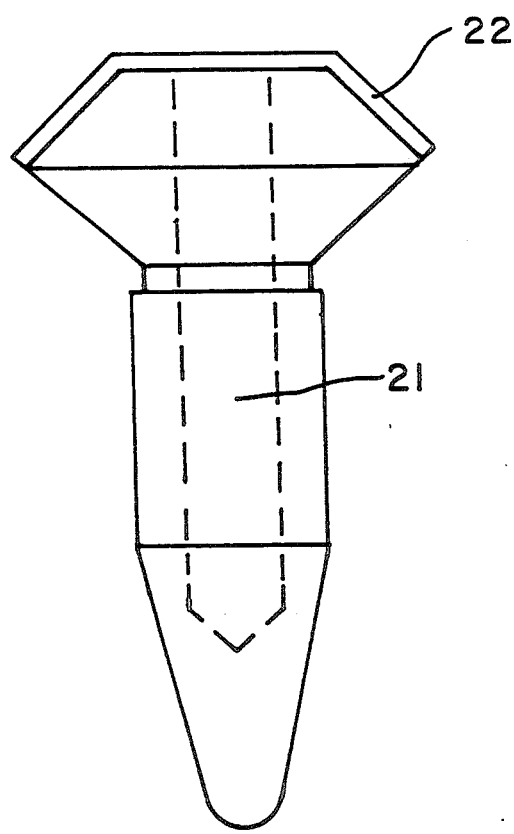

The plug in FIG. 4 is made of water which has frozen to ice in the shape illustrated, e.g. in a freezing mould. Pulverized straw or saw-dust may be admixed to improve the mechanical strength of the ice.

The plug has a bore 21 which serves as a guide for the guide pin of the cutting device. In order to protect the protruding part of the plug against the heat from e.g. the singeing oven and to shield the pilot hole from ingress of water from the surface treatment plant, this part is provided with a heat reflective foil 22.

In a slightly changed embodiment the bore is provided with a piece of plastic pipe which may add strength to the plug. It also serves as a guide for the guide pin of the cutting device.

The ice plug may be solid and have an outside guiding part like the plug in FIG. 3. The freezing property may be improved by including a core of frozen saline solution, which will start melting at a lower temperature than will the rest of the plug. The heat used for this will contribute to keeping the rest of the plug frozen.

The process steps used in connection with this plug are generally the same as those used in connection with the plug shown in FIG. 1 and FIG. 3. However, new plugs have to be produced and supplied all the time. On the other hand, in this embodiment the process steps comprising removal, cleaning and returning of the plugs are no longer necessary, as the plug will melt away while the casings are being transported to the casing plant in the casing trays.

Figure 5:
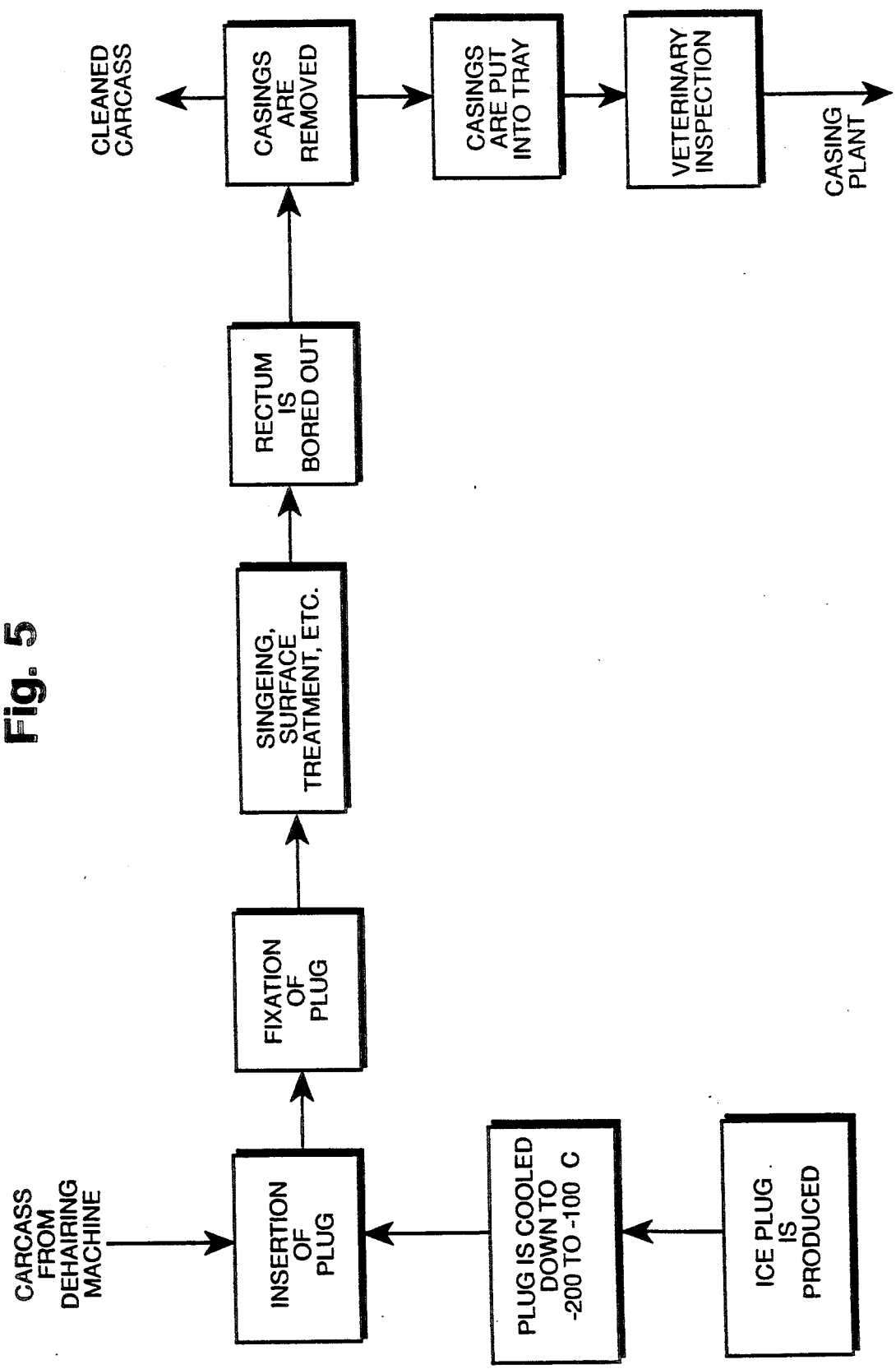

FIG. 5 illustrates the process steps which may be performed when the ice plug is inserted before the singeing oven on the slaughter line.

I claim:

1. A method for eviscerating animal carcasses, said method comprising the steps of: freezing a plug to a temperature below the point of water; inserting the plug into the anus of a carcass; and cutting around the anus.

2. Method according to claim 1, wherein the plug is cooled down to such a temperature that, after the insertion into the anus, it will freeze on to the carcass at the anus.

3. Method according to claim 2, wherein the plug is cooled down to $-20°$ C. or below before the insertion, especially $-40°$ C. or below.

4. Method according to claim 1, further comprising the step of moistening the plug.

5. Method according to claim 1, further comprising the step of freezing a liquid to a predetermined shape to form the plug.

6. A plug for insertion into the anus of an animal carcass for eviscerating the carcass, said plug comprising a sealing section which defines a seal face and an elongate inserting section, said sealing section having a heat conductivity greater than that of the inserting section.

7. A plug for insertion into the anus of an animal carcass for eviscerating the carcass, said plug comprising a sealing section which defines a seal face and an elongate inserting section, a substantial portion of the plug being formed of ice.

* * * * *

UNITED STATES PATENT AND TRADEMARK OFFICE
CERTIFICATE OF CORRECTION

PATENT NO. : 5,114,380
DATED : May 19, 1992
INVENTOR(S) : Poul Larsen It is certified that error appears in the above-identified patent and that said Letters Patent is hereby corrected as shown below:

Title page: item [30], please delete "Netherlands" and substitute therefor -- Denmark --.

Signed and Sealed this

Twenty-fourth Day of August, 1993

*Attest:*

*Attesting Officer*

BRUCE LEHMAN

*Commissioner of Patents and Trademarks*